United States Patent
Song et al.

(10) Patent No.: US 12,233,747 B2
(45) Date of Patent: Feb. 25, 2025

(54) VARYING VEHICLE CHARGING BUS

(71) Applicant: Ford Global Technologies, LLC, Dearborn, MI (US)

(72) Inventors: Yantao Song, Northville, MI (US); Baoming Ge, Okemos, MI (US); Lihua Chen, Farmington Hills, MI (US); Serdar Hakki Yonak, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 712 days.

(21) Appl. No.: 17/554,740

(22) Filed: Dec. 17, 2021

(65) Prior Publication Data
US 2023/0191946 A1 Jun. 22, 2023

(51) Int. Cl.
*B60L 58/18* (2019.01)
*B60L 1/00* (2006.01)
*B60L 53/20* (2019.01)
*H02J 7/00* (2006.01)
*H02M 3/04* (2006.01)
*H02M 3/158* (2006.01)
*H02M 1/10* (2006.01)

(52) U.S. Cl.
CPC .......... *B60L 58/18* (2019.02); *B60L 1/00* (2013.01); *B60L 53/20* (2019.02); *H02J 7/007* (2013.01); *H02M 3/04* (2013.01); *H02M 3/158* (2013.01); *H02M 3/1582* (2013.01); *H02M 3/1588* (2013.01); *H02J 2207/20* (2020.01); *H02M 1/10* (2013.01)

(58) Field of Classification Search
CPC .............................. H02M 3/04; H02M 3/1582
See application file for complete search history.

(56) References Cited

U.S. PATENT DOCUMENTS

| | | | |
|---|---|---|---|
| 8,723,490 B2 | 5/2014 | Moussaoui et al. | |
| 2020/0298722 A1* | 9/2020 | Smolenaers | H02J 7/345 |
| 2021/0075318 A1* | 3/2021 | Lee | H02M 3/07 |
| 2023/0166724 A1* | 6/2023 | Wang | B60L 53/22 |
| | | | 701/22 |
| 2023/0182594 A1* | 6/2023 | Ge | B60L 50/40 |
| | | | 307/10.1 |
| 2024/0367537 A1* | 11/2024 | Casci | H02P 27/08 |

FOREIGN PATENT DOCUMENTS

| | | |
|---|---|---|
| JP | H11507499 A | 6/1999 |
| WO | 2014044913 A1 | 3/2014 |

* cited by examiner

*Primary Examiner* — Jue Zhang
*Assistant Examiner* — Lakaisha Jackson
(74) *Attorney, Agent, or Firm* — David B. Kelley; Brooks Kushman P.C.

(57) ABSTRACT

A power system, responsive to a detected change in an onboard charger or a generator, switches a converter from a first conversion setting, in which a first low voltage value of a medium-voltage bus port is converted to a first high voltage value of a high-voltage bus port, to a second conversion setting, in which a second low voltage value of the medium-voltage bus port is converted to the first high voltage value of the high-voltage bus port.

20 Claims, 6 Drawing Sheets

VARYING VEHICLE CHARGING BUS

TECHNICAL FIELD

The present disclosure relates to systems and methods for charging a vehicle battery.

BACKGROUND

Many vehicle power systems are designed to provide electrical power to a traction battery to propel a vehicle. These power systems are configured to receive and deliver electricity having high voltage traction batteries and traction motors. To recharge the traction batteries from a low-voltage source such as a home, some power systems are configured to interact with an onboard charger that is configured to convert a lower voltage to a higher voltage.

SUMMARY

A power system for a vehicle includes a converter having a high-voltage bus port, a medium-voltage bus port, and a plurality of switches disposed electrically between the high-voltage bus port and medium-voltage bus port. The converter, with a first conversion setting, converts a first low voltage value of the medium-voltage bus port to a first high voltage value of the high-voltage bus port in response to a first command, and with a second conversion setting, converts a second low voltage value of the medium-voltage bus port to the first high voltage value of the high-voltage bus port in response to a second command.

A method includes, after a detected change in a vehicle component parameter, switching a vehicle power converter having a high-voltage bus port, a medium-voltage bus port, and a plurality of switches disposed electrically between the high-voltage bus port and medium-voltage bus port from a first conversion setting, in which a first low voltage value of the medium-voltage bus port is converted to a first high voltage value of the high-voltage bus port, to a second conversion setting, in which a second low voltage value of the medium-voltage bus port is converted to the first high voltage value of the high-voltage bus port.

A power system for a vehicle includes a bi-directional converter having a high-voltage bus port, a medium-voltage bus port, and a plurality of switches disposed electrically between the high-voltage bus port and medium-voltage bus port, and a controller. The controller, responsive to a detected change in an onboard charger of the vehicle or a generator of the vehicle, switches the converter from a first conversion setting, in which a first low voltage value of the medium-voltage bus port is converted to a first high voltage value of the high-voltage bus port, to a second conversion setting, in which a second low voltage value of the medium-voltage bus port is converted to the first high voltage value of the high-voltage bus port.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
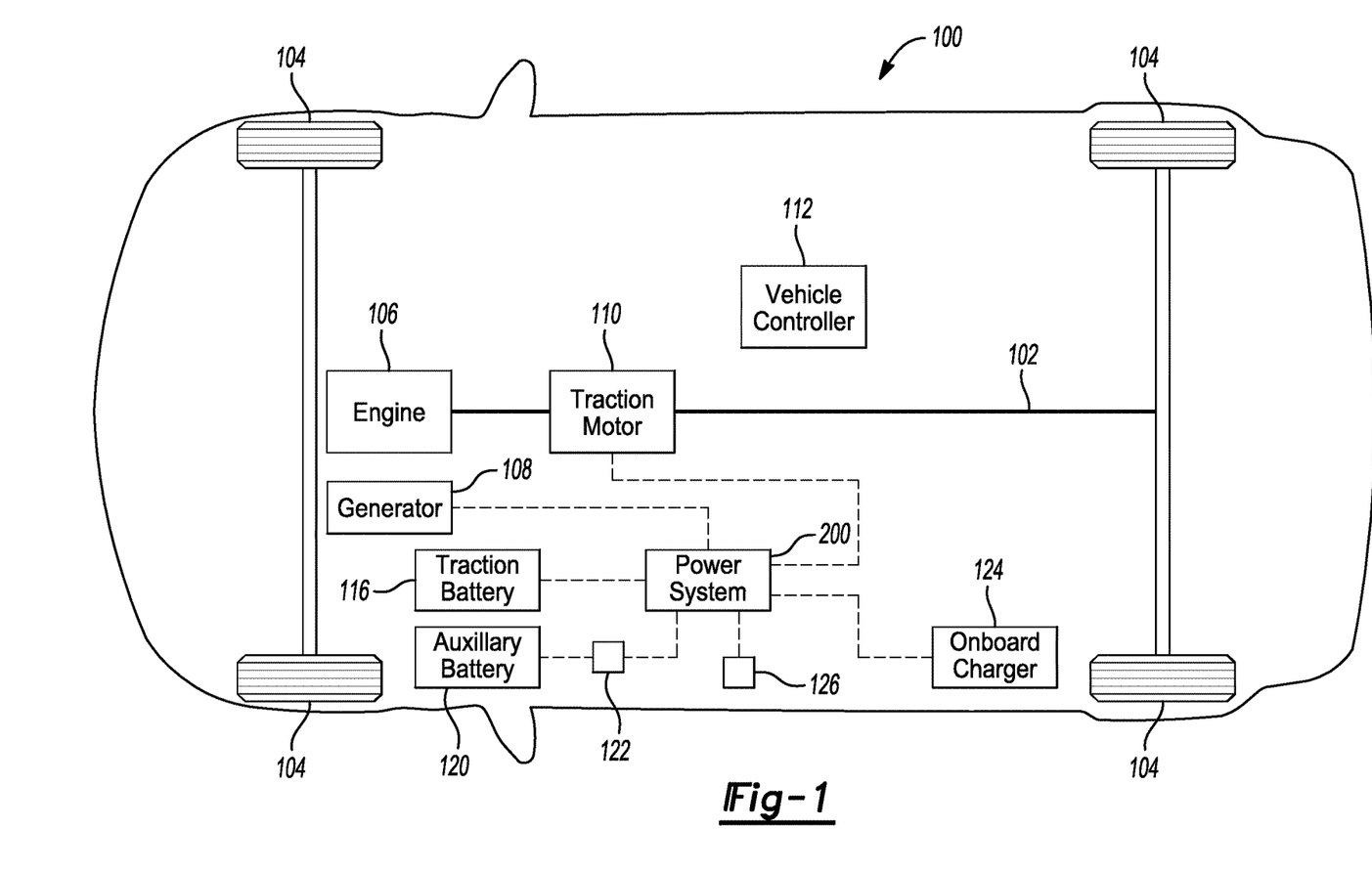
FIG. 1 presents a vehicle.

FIG. 1 presents a vehicle 100. The vehicle 100 comprises a drivetrain 102. The drivetrain 102 is configured to propel the vehicle 100 via a plurality of wheels 104. The drivetrain 102 may configured to received torque from a prime mover. As shown, the vehicle 100 contains both an engine 106 and a traction motor 110 as prime movers. In this embodiment, the engine 106 is mechanically linked to the drivetrain 102. The engine 106 may convert chemical energy from a fuel source into mechanical energy. In particular, the engine 106 may provide mechanical energy in the form of rotational energy exerted upon a crankshaft. The engine 106 may be configured to provide the mechanical energy to a transmission through the crankshaft. The engine 106 may include a plurality of sensors. One of the sensors may determine and provide engine parameters to a vehicle controller 112. For example, an engine sensor may determine and provide temperature, speed, fuel economy, lubricant level, or other parameters. In some embodiments, the engine 106 may be mechanically linked to the drivetrain 102 via a transmission. The linkage between the drivetrain 102 and the engine 106 may be facilitated by a transmission.

The traction motor 110 may be configured to convert electrical energy into mechanical energy. For example, the traction motor 110 may be configured to receive electrical energy from a vehicle battery to provide mechanical energy to the drivetrain 102. Alternatively, the traction motor 110 may be configured to receive electrical energy from an electrical bus network. As such, the traction motor 110 may be configured to receive electrical energy from other vehicle components configured to provide electrical energy to the electrical bus network. The traction motor 110 may be configured to receive DC electricity.

The vehicle 100 includes a generator 108. The generator 108 may be configured to convert mechanical energy into electrical energy. In some embodiments, the generator 108 may be configured to convert mechanical energy from an internal combustion engine into electrical energy for charging a vehicle battery. The generator 108 may also be used to convert mechanical energy from an internal combustion engine into electrical energy for powering a vehicle load. The generator 108 may be configured to output DC electricity. In some embodiments, the vehicle may be an electric vehicle. In such embodiments, the vehicle may not include a generator dependent upon an internal combustion engine. Even further, energy collected for charging a vehicle battery may be received from alternate sources independent from an IC engine. For example, the vehicle may include a regenerative braking system configured to provide energy to the vehicle battery.

The vehicle 100 includes an onboard charger 124. The onboard charger 124 is configured to receive electrical charge from a stationary source to provide to the vehicle 100. Examples of stationary sources may be a power grid, a charging station, etc. The onboard charger 124 may be configured to receive electricity having alternating current. Additionally, or alternatively, the onboard charger 124 may be configured to receive and deliver electricity having direct current. In some embodiments, the onboard charger 124 may be configured to boost a charging voltage. For example, the onboard charger 124 may be configured to boost 120 volts into 400 volts.

The vehicle includes a traction battery 116. The traction battery 116 may be used to store electrical energy. Further, the traction battery 116 may be used to convert the stored electrical energy into mechanical energy to propel a vehicle 100. The traction battery 116 may include a plurality of battery cells. In some embodiments, at least two of the battery cells of the plurality of battery cells are resistively sequential. In such embodiments, the electrical potential of both of the battery cells may be summed. Alternatively, or additionally, at least two of the battery cells of the plurality of battery cells are resistively parallel. In such embodiments, the electrical current capacity may be summed. The traction battery 116 may have a plurality of sensors. One of the sensors may determine and provide battery parameters to a vehicle controller.

The vehicle includes an auxiliary battery 120. Similar to the traction battery 116, the auxiliary battery 120 may be used to store electrical energy. The auxiliary battery 120 may be used to power the auxiliary components 122 within a vehicle. The auxiliary components 122 may include climate control, audio components, and other low-voltage functions.

The vehicle includes a power supply 126. The power supply may be used to supply electricity from the vehicle to a device separate from the vehicle. For example, the power supply may be a source of 120/240 volts to charge a laptop. Another example may be an industrial vehicle configured to supply electricity to power tools via the power supply 126. As such, the power supply 126 may be configured to supply electrical power having direct current, alternating current, or both.

The vehicle controller 112 may include a memory system and a processor. The memory system may be configured to store instruction sets such as programs, algorithms, methods, etc. The memory system may be further configured to receive, monitor, and store values presented to the vehicle controller 112. Further, the memory may serve as a database. As such, the memory may create, store, and edit data stored in the database. The database may define a schedule. Alternatively, or additionally, the database may define a plurality of schedules. A schedule may include entries used as reference for operating a device. The processor may be configured to execute instruction sets. The vehicle controller 112 may be configured to receive signals indicative of information from external sources including by not limited to sensors, devices, and other controllers. The vehicle controller 112 may be configured to receive information by various ways including electrical communication and electrical-magnetic communication. Further, the vehicle 100 may comprise a plurality of controllers.

The vehicle controller 112 may be in communication with the engine 106, the traction battery 116, the drivetrain 102, an exhaust system, the generator 108, and the traction motor 110 of the vehicle 100. The vehicle controller 112 may further be in commutation with braking systems, including a regenerative braking system and a friction braking system. The vehicle controller 112 may be configured to retrieve values from each of the components of a vehicle 100 such as engine speed, battery SOC, vehicle torque, exhaust flow, and the conditions of a power system.

Figure 2:
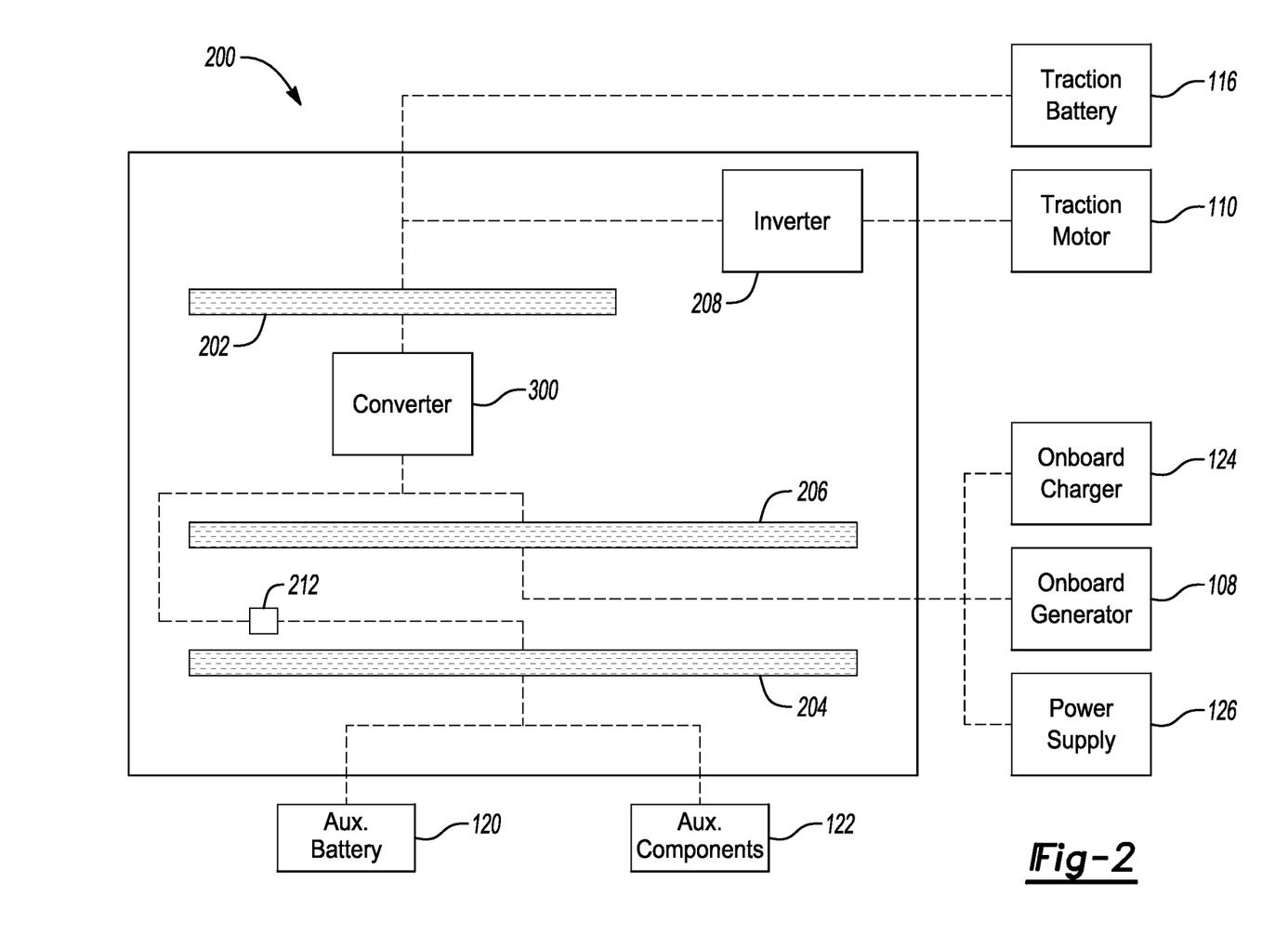
FIG. 2 presents a detailed view of a power network.

The power system 200 is configured to facilitate the electrical communication between power electronics within a vehicle 100. In particular, the power system 200 is configured to facilitate power transfer from the traction battery 116 to the drivetrain 102 via the traction motor 110. Even further, the power system is configured to facilitate power transfer from the auxiliary battery 120 to the auxiliary components 122.

FIG. 2 presents a detailed view of the power system 200. The power system 200 may use at least one electrical bus network to facilitate the communication. One of the electrical bus networks may be a high-voltage bus network 202. The high-voltage bus network 202 may be configured to provide DC electricity to electrical components requiring a high voltage. For example, the high-voltage bus network 202 may be configured to have an electrical potential difference of 800 volts. The high-voltage bus network 202 may be configured to be in direct electrical communication with the traction battery 116. Another of the electrical bus networks may be a low-voltage bus network 204. The low-voltage bus network 204 may be configured to provide DC electricity to electrical components that require a low voltage. For example, the low-voltage bus network 204 may be configured to have an electrical potential difference of 24 volts. The low-voltage bus network 204 may be in direct electrical communication with the auxiliary battery 120. Even another of the electrical bus networks may be a medium-voltage bus network 206. The medium-voltage bus network 206 may be used to receive and provide electric charge to various devices. As shown, in some embodiments the medium-voltage bus network 206 may be configured to receive electric charge from the onboard charger 124 and the generator 108. Additionally, the medium-voltage bus network 206 may be configured to provide electrical charge to the power supply 126. Electrical communication between the low-voltage bus network 204 and the medium voltage network 206 may be regulated by a DC/DC converter 212. The DC/DC converter 212 may be configured to act as a boost converter. As such, the DC/DC converter 212 may be configured to boost an electric potential value from the low-voltage bus network 204 to the electric potential value of the medium-voltage network 206. Electrical communication between the various devices and the medium-voltage bus network 206 may be regulated by a supplementary converter. The supplementary converter may be configured to act as a boost converter from at least one of the onboard charger 124 and the generator 108 to the medium-voltage bus network 206. Additionally, or alternatively, the converter may act as a buck converter from the medium-voltage network 206 to the power supply 126. Even further, in some embodiments, each of the onboard charger 124, the generator 108, and the power supply 126 may have a supplementary converter installed within the component. In such embodiments, the supplementary converter may act as an isolated converter. The supplementary converter may have multiple steps. In particular, the supplementary converter may be configured to convert DC to DC and DC to AC.

The power system 200 may include an inverter 208. The inverter 208 is configured to invert a DC electrical current into an AC electrical current. The inverter 208 may be used to modify the DC power from the traction battery 116 into AC power for the traction motor 110.

The power system 200 may include a common ground. The ground may be configured to act as a source of low electrical potential to facilitate the flow of electrical current.

In some embodiments, the high-voltage bus network 202 shares a common ground with the low-voltage bus network 204. Alternatively, the power system 200 may have a plurality of electrical grounds.

The power system 200 may have a converter 300. The converter 300 may be configured to convert electricity of a first set of electrical parameters into a second set of electrical parameters. For example, the converter 300 may be configured to convert electricity having 400 volts into electricity having 800 volts.

Figure 3:
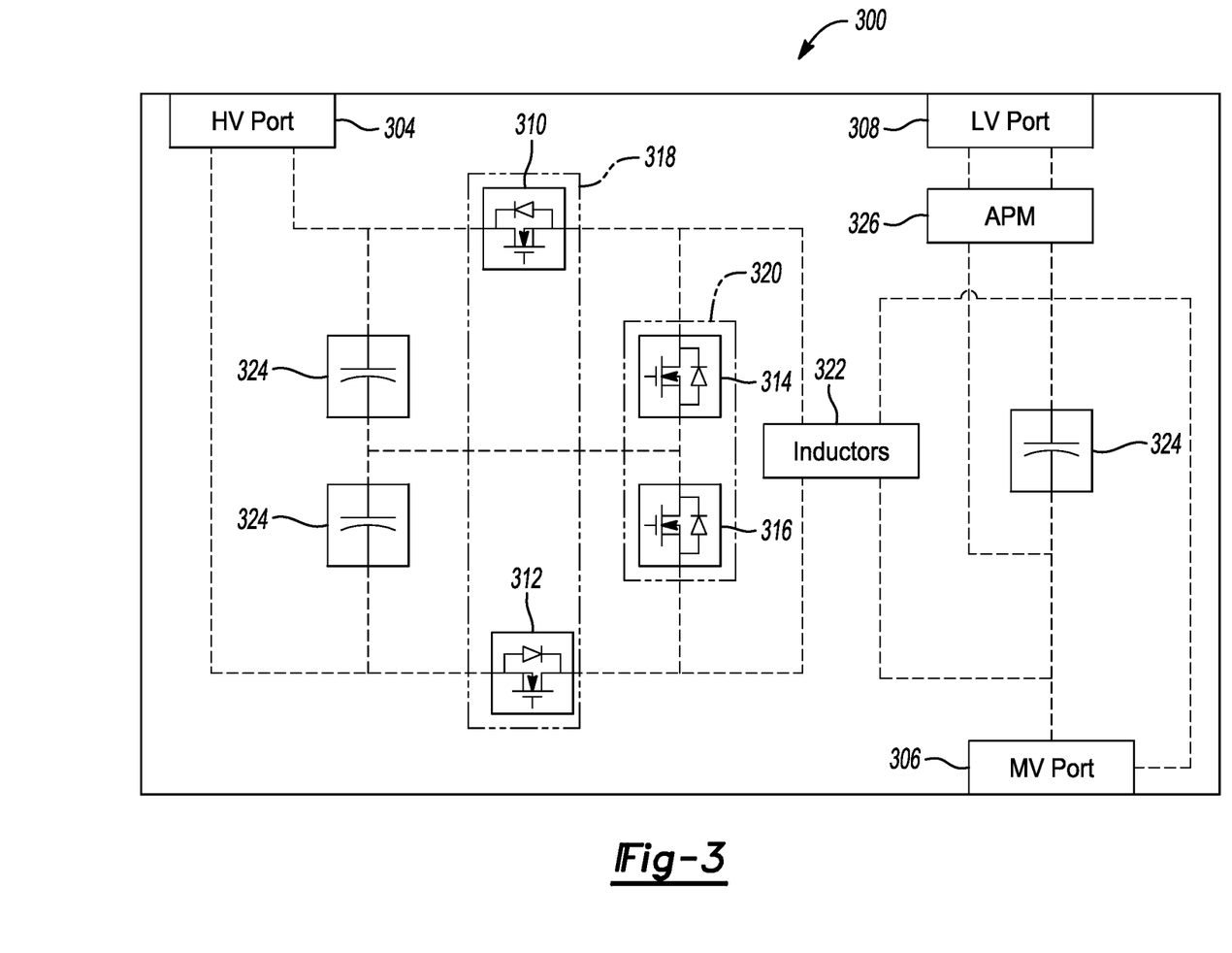
FIG. 3 presents a detailed view of a converter.

FIG. 3 presents a detailed view of the converter 300. The converter 300 may include a high voltage bus port 304 and a medium voltage bus port 306 that are configured to interact with the high voltage electrical bus 202 and medium voltage electrical bus 206 respectively. In some embodiments, such as the one shown, the converter 300 may include a low voltage bus port 308 that is configured to interact with the low voltage electrical bus 204. In such embodiments, the converter 300 may include an auxiliary power module 326 to isolate the low-voltage bus port 308 from the high voltage bus port 304 and the medium voltage bus port 306. Additionally, or alternatively, the medium voltage bus port 306 may be configured to interact with both medium and low voltages. The converter 300 may be a bi-directional converter. To facilitate the bi-directional configuration, the converter 300 may be include auxiliary components 122. The auxiliary components 122 may be defined by at least one of, or a combination of, IGBTs, MOSFETs, and diodes. The auxiliary components 122 may include a first switch 310, a second switch 312, a third switch 314, and a fourth switch 316. The first switch 310 and the second switch 312 may define a first switch group 318 while the third switch 314 and fourth switch 316 may define a second switch group 320. Additionally, the converter 300 may have a plurality of inductors 322 and a plurality of capacitors 324.

The converter 300 is configured to switch between modes. These modes may include modes defined as buck, boost, and shoot-through. The vehicle controller 112 may be configured to command the converter 300 to switch between modes based on parameters of the vehicle 100. For instance, the vehicle controller 112 may be programmed to command the converter 300 to switch between modes based on vehicle speed, torque requests, vehicle acceleration, battery SOC, etc. In one embodiment, the converter may be switched from a buck mode to a boost mode in response to detection of an electrical current within an onboard charger. In buck mode, the converter 300 may be configured to allow a positive electrical current to traverse from the high voltage bus port 304 to the medium voltage bus port 306. In buck mode, the first switch group 318 may operate as synchronous rectifiers while the fourth switch 316 may be controlled to regulate power flow. This configuration may allow discharging of the traction battery 116 to the medium voltage electrical bus 206. In boost mode, the converter 300 may be configured to allow a positive electrical current to traverse from the medium voltage bus port 306 to the high voltage bus port 304. In buck mode, the fourth switch 316 may operate as a synchronous rectifier while the first switch group 318 may be controlled to regulate power flow. This configuration may allow charging of the traction battery 116 from the medium voltage electrical bus 206. In shoot-through mode the fourth switch 316 may be always on. This configuration may be used when the voltage of the high voltage electrical bus 202 and the medium voltage electrical bus 206 are substantially the same. Additionally, each switch group may operate to form a phase shift. This phase shift may be 180 degrees. In embodiments set to shift the phase of the current, the converter 300 may act as an interleaved converter.

Figure 4:
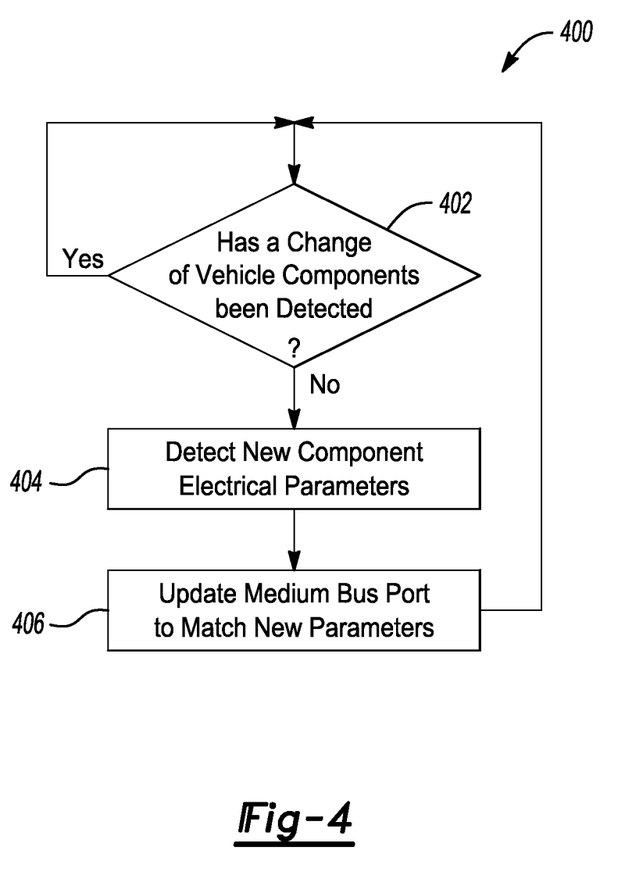
FIG. 4 presents a first voltage selection method.

FIG. 4 presents a first voltage selection method 400. The first voltage selection method 400 begins with a monitor power component step 402, in which the vehicle controller 112 monitors the state of components on the medium voltage electrical bus 206. These components may include the generator 108 and the onboard charger 124. If the components remain the same, the vehicle controller 112 will continue to monitor the state of the components. If one of the components on the medium voltage electrical bus 206 is removed, the first voltage selection method 400 moves to a detect new range step 404, in which the vehicle controller 112 determines the electrical parameters of the new component. This may include the vehicle controller 112 querying a schedule based on an identification factor of the new component. Next in the update range step 406, the vehicle controller 112 commands the medium voltage electrical bus 206 to update the voltage of the medium voltage bus port 306 based on the electrical parameters of the new electrical component and returns to the monitor power component step 402.

Figure 5:
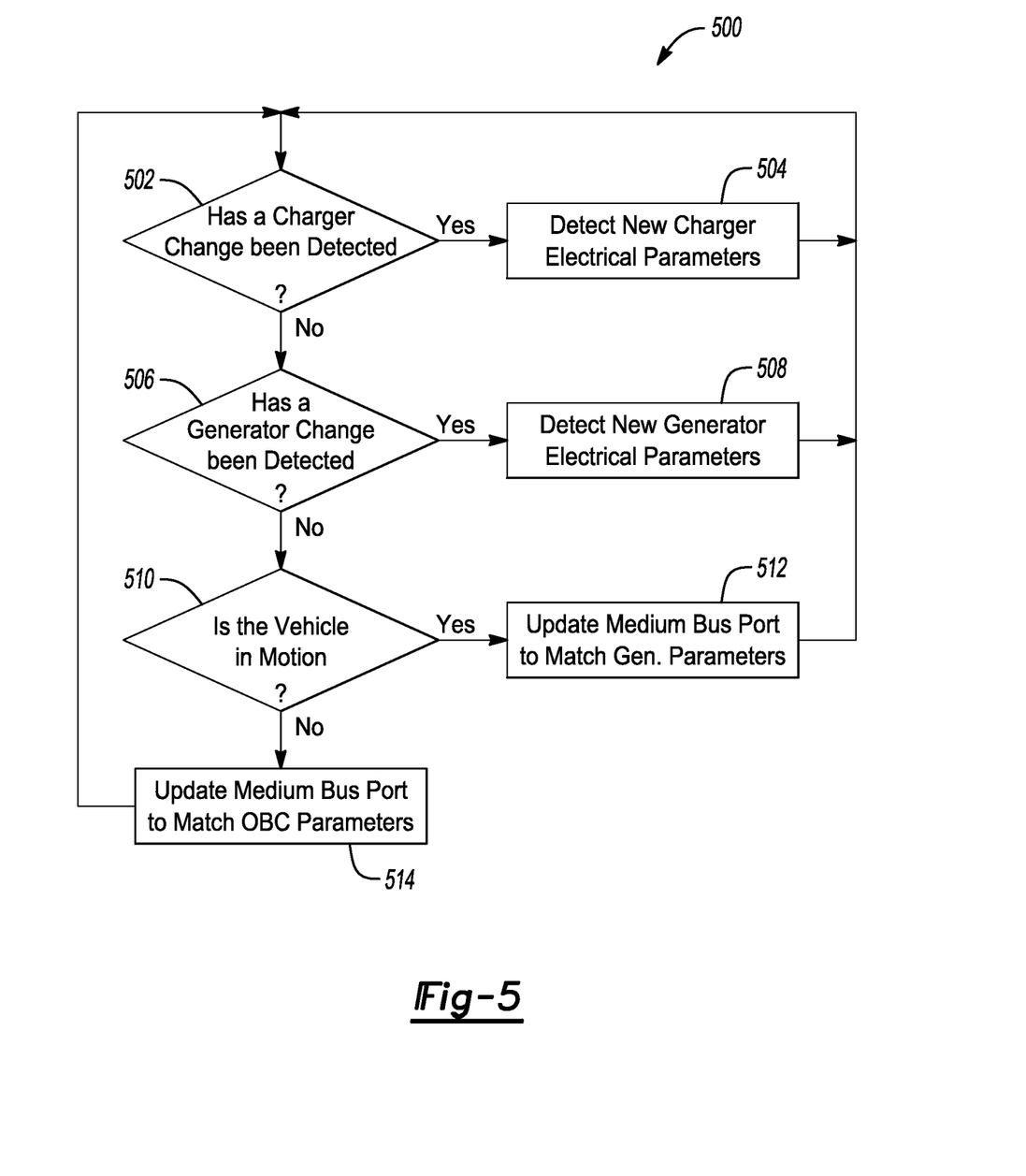
FIG. 5 presents a second voltage selection method.

FIG. 5 presents a second voltage selection method 500. The second voltage selection method 500 begins with a monitor OBC step 502, in which the vehicle controller 112 monitors the medium voltage electrical bus 206 to detect if parameters of the onboard charger 124 have changed. This may be due to a swap or an installation of a new onboard charger. If the parameters of the onboard charger 124 change, the vehicle controller 112 will move to a detect new OBC range step 504, in which the vehicle controller 112 determines the electrical parameters of the new onboard charger and then returns to the monitor OBC step 502. If the parameters of the onboard charger 124 remain the same, the vehicle controller 112 will move to a monitor generator step 506, in which the vehicle controller 112 determines the electrical parameters of the generator 108 have changed. If the parameters of the generator 108 have changed, the vehicle controller 112 will move to a detect new generator range step 508, in which the vehicle controller 112 determines the electrical parameters of the new generator and then returns to the monitor OBC step 502. If the parameters of the generator 108 remain the same, the second voltage selection method 500 will move to a detect vehicle motion step 510 and determine if the vehicle 100 is in motion. If the vehicle 100 is not in motion, the second voltage selection method 500 will move to an update OBC range step 512, in which the medium voltage electrical bus 206 is updated to the new charger voltage range. If the vehicle 100 is in motion, the second voltage selection method 500 will move to an update to generator step 514, in which the medium voltage electrical bus 206 is updated to the new generator voltage range.

Figure 6:
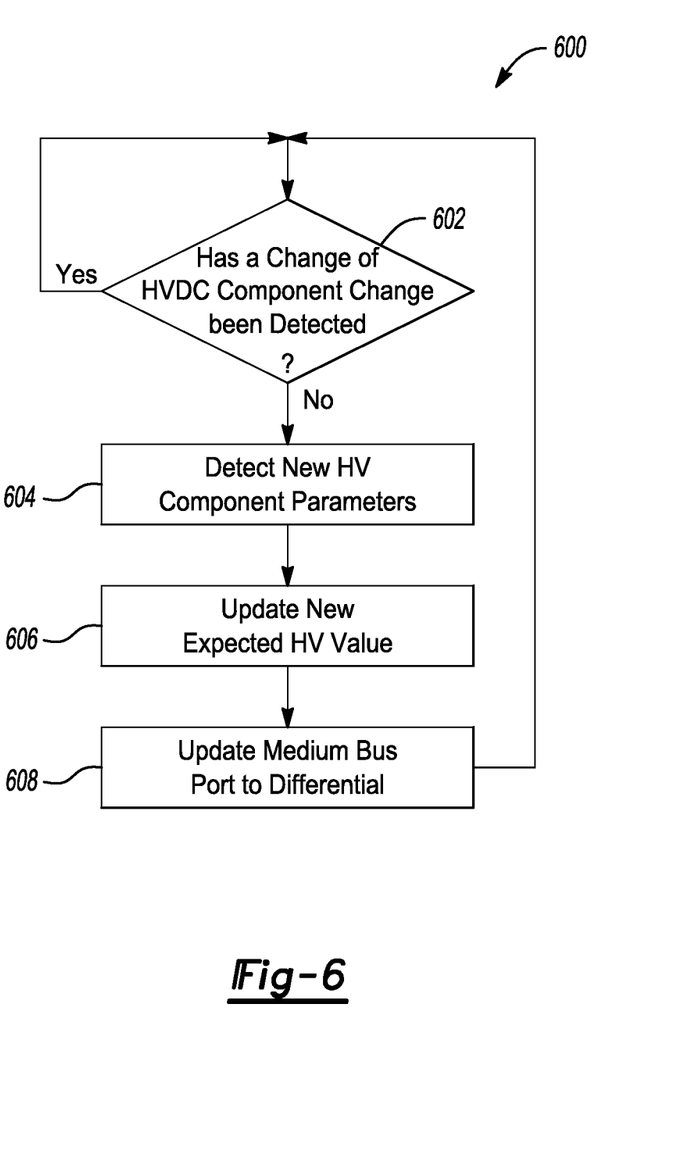
FIG. 6 presents a third voltage selection method.

FIG. 6 presents a third voltage selection method 600. The third voltage selection method 600 begins with a monitor HVDC bus step 602, in which the vehicle controller 112 monitors the high voltage electrical bus 202 to detect if parameters of a high voltage component have changed. High voltage components may include a new vehicle battery, a new vehicle motor, etc. If parameters of the high voltage components have not changed, the vehicle controller 112 will continue to monitor the high voltage electric bus 202 for changes. However, upon detection of a change on the high voltage electric bus 202, the third voltage selection method 600 will move to a detect new HV component step 604, in which the vehicle controller 112 will determine the new parameters of the high voltage electrical bus 202. Next, the vehicle controller 112 will update the known voltage of the high voltage electrical bus 202 in the update to HV component range step 606. Further, the vehicle controller 112 will update a differential between the high voltage electrical bus 202 and medium voltage electrical bus 206 in the update to differential range step 608 based on the known voltages of the high voltage electrical bus 202 and the medium voltage electrical bus 206. The vehicle controller 112 will use this differential to boost or buck the voltage of the medium voltage bus 206 accordingly. Finally, the third voltage selection method 600 will return to the monitor HVDC bus step 602.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words controller and controllers, for example, can be used interchangeably herein.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A power system for a vehicle comprising:
 a converter having a high-voltage bus port, a medium-voltage bus port, and a plurality of switches disposed electrically between the high-voltage bus port and medium-voltage bus port, the converter being configured to,
 with a first conversion setting, convert a first low voltage value of the medium-voltage bus port to a first high voltage value of the high-voltage bus port in response to a first command, and
 with a second conversion setting, convert a second low voltage value of the medium-voltage bus port to the first high voltage value of the high-voltage bus port in response to a second command.

2. The power system of claim 1, further comprising a controller programmed to command the converter to switch from the first conversion setting to the second conversion setting in response to a detected change in a vehicle component parameter.

3. The power system of claim 2, wherein the second low voltage value is based in part on electrical parameters of the detected change in the vehicle component parameter.

4. The power system of claim 2, wherein the vehicle component is an onboard charger.

5. The power system of claim 2, wherein the vehicle component is a generator.

6. The power system of claim 1, wherein the converter is a bi-directional converter configured to shift between a buck mode and a boost mode.

7. The power system of claim 6, further comprising a controller programmed to command the plurality of switches such that the converter shifts between a buck mode and a boost mode.

8. The power system of claim 7, wherein the controller is programmed to,
 operate a first group of switches of the plurality of switches as synchronous rectifiers, and
 operate a second group of switches of the plurality of switches to regulate power transfer between the high-voltage bus port and the medium-voltage bus port.

9. The power system of claim 7, wherein the controller is programmed to command the converter to switch from a buck mode to a boost mode upon detection of an electrical current on an onboard charger.

10. The power system of claim 1, further comprising a power supply in electrical communication with the medium-voltage bus port, and configured to provide electrical power to a load separate from the vehicle.

11. The power system of claim 10 further comprising a supplemental converter electrically disposed between the medium-voltage bus port and one of an onboard charger and the power supply, wherein the power system is configured to regulate power transfer between the medium-voltage bus port and at least one of the onboard charger and power supply.

12. A method comprising:
 after a detected change in a vehicle component parameter, switching a vehicle power converter having a high-voltage bus port, a medium-voltage bus port, and a plurality of switches disposed electrically between the high-voltage bus port and medium-voltage bus port from a first conversion setting, in which a first low voltage value of the medium-voltage bus port is converted to a first high voltage value of the high-voltage bus port, to a second conversion setting, in which a second low voltage value of the medium-voltage bus port is converted to the first high voltage value of the high-voltage bus port.

13. The method of claim 12 further comprising commanding the plurality of switches such that the converter shifts between a buck mode and a boost mode.

14. The method of claim 12 further comprising operating a first group of switches of the plurality of switches as synchronous rectifiers, and operating a second group of switches of the plurality of switches to regulate power transfer between the high-voltage bus port and the medium-voltage bus port.

15. A power system for a vehicle comprising:
   a bi-directional converter having a high-voltage bus port, a medium-voltage bus port, and a plurality of switches disposed electrically between the high-voltage bus port and medium-voltage bus port; and
   a controller programmed to, responsive to a detected change in an onboard charger of the vehicle or a generator of the vehicle, switch the converter from a first conversion setting, in which a first low voltage value of the medium-voltage bus port is converted to a first high voltage value of the high-voltage bus port, to a second conversion setting, in which a second low voltage value of the medium-voltage bus port is converted to the first high voltage value of the high-voltage bus port.

16. The power system of claim 15, wherein the controller is programmed to command the plurality of switches such that the converter shifts between a buck mode and a boost mode.

17. The power system of claim 15, wherein the controller is programmed to, operate a first group of switches of the plurality of switches as synchronous rectifiers, and operate a second group of switches of the plurality of switches to regulate power transfer between the high-voltage bus port and the medium-voltage bus port.

18. The power system of claim 15, wherein the controller is programmed to command the converter to switch from a buck mode to a boost mode upon a detection of an electrical current on the onboard charger.

19. The power system of claim 15 further comprising a power supply in electrical communication with the medium-voltage bus port, and configured to provide electrical power to a load separate from the vehicle.

20. The power system of claim 19 further comprising a supplemental converter electrically disposed between the medium-voltage bus port and one of the onboard charger and the power supply, wherein the power system is configured to regulate power transfer between the medium-voltage bus port and at least one of the onboard charger and power supply.

* * * * *